United States Patent [19]

Zelkha et al.

[11] Patent Number: 5,837,311
[45] Date of Patent: Nov. 17, 1998

[54] INDUSTRIAL PROCESSING OF TOMATOES AND PRODUCT THEREOF

[75] Inventors: Morris Zelkha, Omer; Mordechai Ben-Yehuda, Beer-Sheva; Dov Hartal, Tel-Aviv; Yigal Raveh, Haifa; Nissim Garti, Jerusalem, all of Israel

[73] Assignees: Makhteshim Chemical Works Ltd., Israel; Makhteshim Agan of North America Ltd.

[21] Appl. No.: 667,463

[22] Filed: Jun. 21, 1996

Related U.S. Application Data

[63] Continuation-in-part of Ser. No. 661,670, Jun. 11, 1996, abandoned.

[30] Foreign Application Priority Data

Dec. 13, 1993 [IL] Israel ......................................... 107999

[51] Int. Cl.⁶ .............................. A23L 1/221; A23L 1/222
[52] U.S. Cl. ......................... 426/651; 426/270; 426/478; 426/481; 426/495; 426/615; 426/655
[58] Field of Search ................................... 426/253, 270, 426/651, 615, 495, 478, 481, 655

[56] References Cited

U.S. PATENT DOCUMENTS

| | | | |
|---|---|---|---|
| 1,324,538 | 12/1919 | Boyles | 426/651 |
| 2,723,199 | 11/1955 | Todd | 426/481 |
| 2,799,588 | 7/1957 | Todd | 426/581 |

FOREIGN PATENT DOCUMENTS

| | | |
|---|---|---|
| 0470923 A1 | 2/1992 | European Pat. Off. . |
| 0608027 A2 | 7/1994 | European Pat. Off. . |

*Primary Examiner*—Helen Pratt
*Attorney, Agent, or Firm*—Michael N. Meller

[57] ABSTRACT

Tomatoes are separated into desirable food products by subjecting them, after conventional preliminary treatments, such as crushing, to a separation of serum from pulp by centrifugation at temperatures between 75° and 110° C. and centrifugal force between 2600 and 4000 G, whereby to obtain a pulp that contains at least 500 ppm of lycopene. The pulp is then subjected to extraction by means of solvents having δH (delta H) and δP (delta P) values chosen so as to extract an oleoresin that has a desired content of lycopene, phospholipids and mono- and di-glycerides. The serum is concentrated and mixed either with dehydrated spent tomato pulp or with dispersing agents and the mixture is dried to produce a new food product which is substantially free from sugars and agrochemicals, is low in lipids, and has a water content less than 5 ww %.

18 Claims, 6 Drawing Sheets

INDUSTRIAL PROCESSING OF TOMATOES AND PRODUCT THEREOF

This is a continuation-in-part of application Ser. No. 08/661,670 filed on Jun. 11, 1996, now abandoned.

FIELD OF THE INVENTION

The present invention relates to the field of food processing. Particularly, the invention relates to a process for the industrial processing of tomatoes, which affords the efficient manufacture of tomato products.

BACKGROUND OF THE INVENTION

Tomato products are widely used in the food industry. A number of processes have been proposed and are currently used for manufacturing various tomato products. Such tomato products include, e.g., tomato concentrates, tomato juice, and tomato powder. Lately, lycopene, the red pigment of the tomato, has become of substantial interest as a natural coloring material for food products.

Furthermore, in view of the increasing importance of the tomato as a raw material for the food industry, efforts have been made to breed industrial tomatoes of improved quality. One such development relates to a variety which contains a higher content of lycopene.

One of the difficulties of the food industry is to produce products of constant quality, particularly of constant color, from raw materials of constantly changing properties. This is a considerable problem since the shade of the tomato changes in different seasons, depends on weather, location and growth conditions, and differs from one variety of tomato to another. This problem has not yet been fully solved by the food industry, although a number of solutions have been attempted.

Many processes are known in the art, for manufacturing various tomato products. In conventional processes, tomato paste is produced from tomato juice by vacuum concentration. U.S. Pat. No. 3,172,770 relates to a process for preparing tomato concentrate by means of the crushing of tomatoes and the centrifugal separation of the obtained juice into pulp and serum, which is subsequently further manipulated by concentration, freezing and other preservation methods. The extraction of juice from tomato pulp and its concentration to form paste are also described in IFST Proceedings, Vol. 14, No. 1, 1981, pages 15–27. EP 470923 describes a process comprising cutting rinsed tomatoes into chunks, pulping the chunks to form tomato juice, concentrating the juice to form a paste, forming the concentrate into pieces and drying the concentrate pieces. Journal of Food Science, Vol. 47, No. 6, 1982, pages 1853–1858 discusses energy saving process alternatives in the concentration of tomato products.

U.S. Pat. No. 5,245,095 describes the extraction of carotenoid from carrots and the like.

Zohar Nir et al., "Lycopene From Tomatoes", International Food Ingredients, Vol. 6, 1993, pages 45–51, mention three products resulting from the processing of tomatoes, which are tomato oleoresin, and soluble and insoluble tomato solids, but does not describe the processes by which they are produced.

EP 608027 describes a process for the preparation of a coloring material which contains chromoplast products containing crystalline lycopene, which process comprises selecting and breaking the tomatoes, removing the seeds and waste materials, and recovering insoluble material from the tomato serum.

It is an object of the invention to provide a highly flexible process for the exploitation of tomatoes, which permits to manufacture a variety of end products in various embodiments of the process.

It is another object of the invention to provide a process which permits to exploit parts of the tomato in a manner which was not customary in the art before the invention.

It is a further purpose of the invention to provide a process for the production of lycopene-containing oleoresin from tomatoes in the most efficient manner, in particular for obtaining oleoresin having an optimal combination of high lycopene content and lycopene stability.

It is a still further purpose of the invention to achieve the aforementioned purposes by starting from practically any kind of tomatoes, both those having a high and those having a low lycopene content.

It is a still further purpose of this invention to achieve an optimum balance between the products obtained from the tomato processing.

It is a still further purpose of the invention to provide a technologically controlled process which provides flexible, but exactly controllable results.

Other purposes and advantages of the invention will appear as the description proceeds.

SUMMARY OF THE INVENTION

The process according to the invention, for the exploitation of tomatoes and the manufacture of tomato products, comprises the steps of:

a) pretreating the tomatoes by conventional operations, including crushing;

b) subjecting them to a heat treatment;

c) separating the crushed tomatoes into serum and pulp containing at least 500 ppm, and preferably from 500 to 1600 ppm, of lycopene and preferably a moisture content not higher than 85%;

d) subjecting the pulp to solvent extraction, in order to extract therefrom an oleoresin containing lycopene and separating the spent pulp; and e) separating the lycopene extract from the solvents, whereby to obtain oleoresin containing the lycopene and to recover the solvents.

Preferably, the oleoresin should contain 2% to 10% of lycopene, at least 0.01%, and preferably 0.9–4.5%, of phospholipids and at least 0.01%, and preferably 2–6%, of the mixture of mono- and di-glycerides.

In a variant of the invention the serum may be treated for the production of food products, preferably by centrifuging it further to remove pulp particles and concentrating the centrifuged serum, at least in part, by evaporation. The concentrated serum contains the soluble solids of the tomato. An additional material is then added, chosen from among dehydrated tomato pulp (viz. tomato fibers or insoluble solids) or dispersing agents or carriers, such as maltodestrins, starches, etc. Said addition enables drying on an industrial scale, which would be very difficult without it, and provides new food products.

The concentrated tomato serum and the dehydrated extracted pulp too are new tomato ingredients and are part of the invention.

Step c), above, is carried out by centrifugation according to certain critical parameters. The centrifugation can be carried out in a horizontal centrifuge or so-called "decanter", which is particularly adapted to a continuous process, and which, in spite of the name by which it is designated, effects a centrifugation and not a decantation. Basically, said parameters are: temperature, centrifugal force, percentage of "fines" in the feed and concentration of solids in the feed. Fines are solid particles having a dimension below 20 μm. Preferred values of these parameters are as follows. The temperature should be between 75° and 110° C. The centrifugal force should be between 2600 and 4000 G. "G" is a measure of the g-force, and can be calculated, e.g., as described by Moir, "Sedimentation Centrifuges", Chem. Eng., Mar. 28, 1988. The content of fines should be less than 0.2 ww %. The concentration of solids in the crushed tomatoes should be between 4 and 8 ww % and is controlled by refluxing the serum back to the feed, in order to obtain the required range of said solids concentration. The retention time, which is also an important parameter, depends on the equipment used and can be easily, determined by skilled persons in each case. The material to be separated should be deaerated before heating and separation.

When centrifugation is carried out in a decanter, in order to achieve maximum clarification in the machine, the decanter differential speed, positive direction, should be between 2 and 6 rpm. Both open or closed decanters can be used. For closed decanters, the back pressure should be less than 0.6 bar.

The weight ratio between the pulp obtained from centrifugation and the centrifuge feed (not including the serum reflux) should preferably be not more than 0.13. It is obviously desirable to channel the maximum amount of lycopene to the lycopenpe extraction, to be described, and this purpose is achieved if the parameters described herein are maintained within the specified limits. However, the process of the invention is sufficiently flexible so that, if desired for any reason, said parameters may be adjusted to vary the lycopene content of the pulp and of the serum to any required values. It will also be understood that different tomatoes will yield pulps with different lycopene content, within the limits hereinbefore set forth, as will be detailed hereinafter.

The serum, separated in step c), which generally constitutes about 90% of the material to be separated, is preferably submitted to a second separation by centrifugation to separate fine solids, which may have remained after the first separation, and which may be treated in various ways, as hereinafter explained. The serum is preferably concentrated by evaporation, e.g. using TASTE evaporator or other equipment, and can be dried after concentration, preferably with the addition of suitable carriers, as hereinbefore set forth.

The pulp that has the required lycopene content is either extracted with solvents or finely ground to produce a lycopene-rich food product. The finely ground pulp is a new product, which is characterized in that it contains most of the tomato insoluble solids, at least 800 ppm of lycopene, up to 85% of water and has an average particle size of 50–150 microns. The finely ground pulp may be used as a coloring material for food products (sauces, soups, etc.)

Oleoresin is a suspension of lycopene in natural tomato lipids. While the art has described the extraction of lycopene with various organic solvents, no information is available as to the optimum concentration of the various other components present in the oleoresin and to the means for achieving such contents. It is assumed that lycopene is the only important oleoresin component and that extraction conditions that achieve the highest possible lycopene content are the most desirable. These inventors have discovered that, while, of course, a high lycopene content is desirable, the performance of the oleoresin in its further processing and use depends essentially on three components: lycopene, phospholipids and glycerides that are either mono- or di-glycerides. The combined contents of these components determine the physical and chemical stability of the oleoresin and its behavior in all further industrial operations. An optimal oleoresin should have the following contents of these components: lycopene from 2% to 10% and preferably from 3% to 6%; phospholipids from 0.7% to 4.5% and preferably from 1.4% to 2.9%; and mono- and di--glycerides from 2% to 6% and preferably from 2.5% to 3.4%. All the percentages are by weight. While no reliable scientific explanation of the above facts is presently available, they have been established by extensive industrial experience.

An oleoresin having such contents of the essential components can be obtained by an appropriate choice of solvents, the extraction conditions being technically correct, as skilled persons will easily understand and determine. Once the proper solvent has been chosen, the extraction is carried out until the maximum amount of the components or at least of the lycopene, achievable with the chosen solvent, is achieved. The solvent or mixture of solvents to be used depends on two parameters: $\delta_H$ and $\delta_P$. A third parameter, which is $\delta_D$, has a narrow range of values and is not critical, but should preferably be as high as possible. According to the invention, $\delta_H$ should vary between 0.0 and 4.5 and $\delta_P$ between 0.0 and 5. If a mixture of solvents is used, the $\delta$ parameters attributed to it should be the linear combination of the $\delta$ parameters of the component solvents. While this may not be scientifically exact, it is a close enough criterion for industrial purposes. The $\delta$ parameters of all possible interesting solvents are well known. A list of them can be found, for instance, in the chapter "Solubility Parameters", of the book Handbook of Solvent Extraction, T. C. Lo, M. H. I. Baird and C. Hanson, T. Wiley Publisher (1983) pp. 25, 30 and 31, and CRC Handbook of Solubility Parameters and Other Cohesion Parameters, 2nd Ed. (A. F. C. Barton) 1982, p.620.

For the purpose of carrying out the invention, it is desirable to define a closer relationship between the $\delta$ parameters of the solvents and the contents of aforesaid essential components in the oleoresin. The inventors have done so in the following manner.

The relationship between the $\delta_H$ and $\delta_P$ parameters, on the one hand, and the contents of each of the aforesaid essential components of the oleoresin, on the other, have been determined and are represented by the three-dimensional diagrams of FIGS. 3 to 5, in which one the coordinate axes represents $\delta_H$, another represents $\delta_P$, and the third represents one of the oleoresin components. The diagrams have been obtained from an oleoresin which had the following contents of the said components: lycopene 5%, phospholipids 1.4% and mono- and di-glycerides together 2.9%. All percentages, in this specification and claims, are by weight, unless otherwise specified. It has been found, however, that the diagrams and the relationships they represent undergo only limited variations if the oleoresin is extracted from a pulp having different contents of lycopene, provided that the lycopene contents remain within the preferred limits of the invention, viz. are between 500 ppm and 1600 ppm. The variations that do occur are practically smaller than the random variations associated with the industrial process of the invention, and anyway, are not such as to affect the industrial performance and quality of the oleoresin, so that the diagram of FIGS. 3 to 5 can be used in carrying out the invention with consistently satisfactory results.

It has been found that most of the solvents indicated by the prior art are not satisfactory. Satisfactory are e.g. hexane, ethyl acetate and dichloromethane.

The extraction is preferably carried out in several stages under conditions that will be described hereinafter. The lycopene extract is separated from the pulp, filtered, preferably more than once, then evaporated in several stages under high vacuum and at elevated temperatures, as will be more fully described hereinafter. Preferably, the lycopene-containing oleoresin is standardized, by blending oleoresins containing high and low lycopene concentrations, to achieve a desired lycopene content in the range 4–20%.

The extracted pulp is directed to solvent recovery and then dried. The dehydrated pulp is used as a food ingredient.

According to an aspect of the invention the extracted pulp, but has been freed from all soluble components, is dried and is then mixed with the concentrated serum to provide a new food product. Said product is a new one in the food industry and is part of the invention. It contains the insoluble solids of the whole ripe tomato fruit and is substantially free from sugars and lipids of the tomato, as well as from agrochemicals. Further, it contains 17–20% of proteins, is rich in dietary fibers, and its water content is less than 5%, whereby it is highly water-absorbent. These properties impart to it useful dietary values, e.g. as a low calorie bulking agent, extender etc. In comparison, fibers currently used in the food industry are produced from external parts of grains, fruit and vegetables such as peels or external layers of grain, and therefore are contaminated by microorganisms, agrochemicals, etc. They usually contain lipids, that oxidize and become rancid, while the tomato fibers according to the invention are stable.

The process of the invention can be carried out with any variety of tomato, but it is particularly desirable to employ high lycopene-containing varieties. The higher the content of lycopene in the tomato, the greater the flexibility of the process and the ability to control the amounts of the various materials which are produced at a given time. Therefore, tomatoes containing at least 80 ppm of lycopene are preferred as raw materials of the process, although, as stated, the process operates with any variety of tomato. A content of 120 ppm, or even 150–350 ppm, of lycopene is even more favorable and preferred.

DETAILED DESCRIPTION OF PREFERRED EMBODIMENTS

Figure 6:
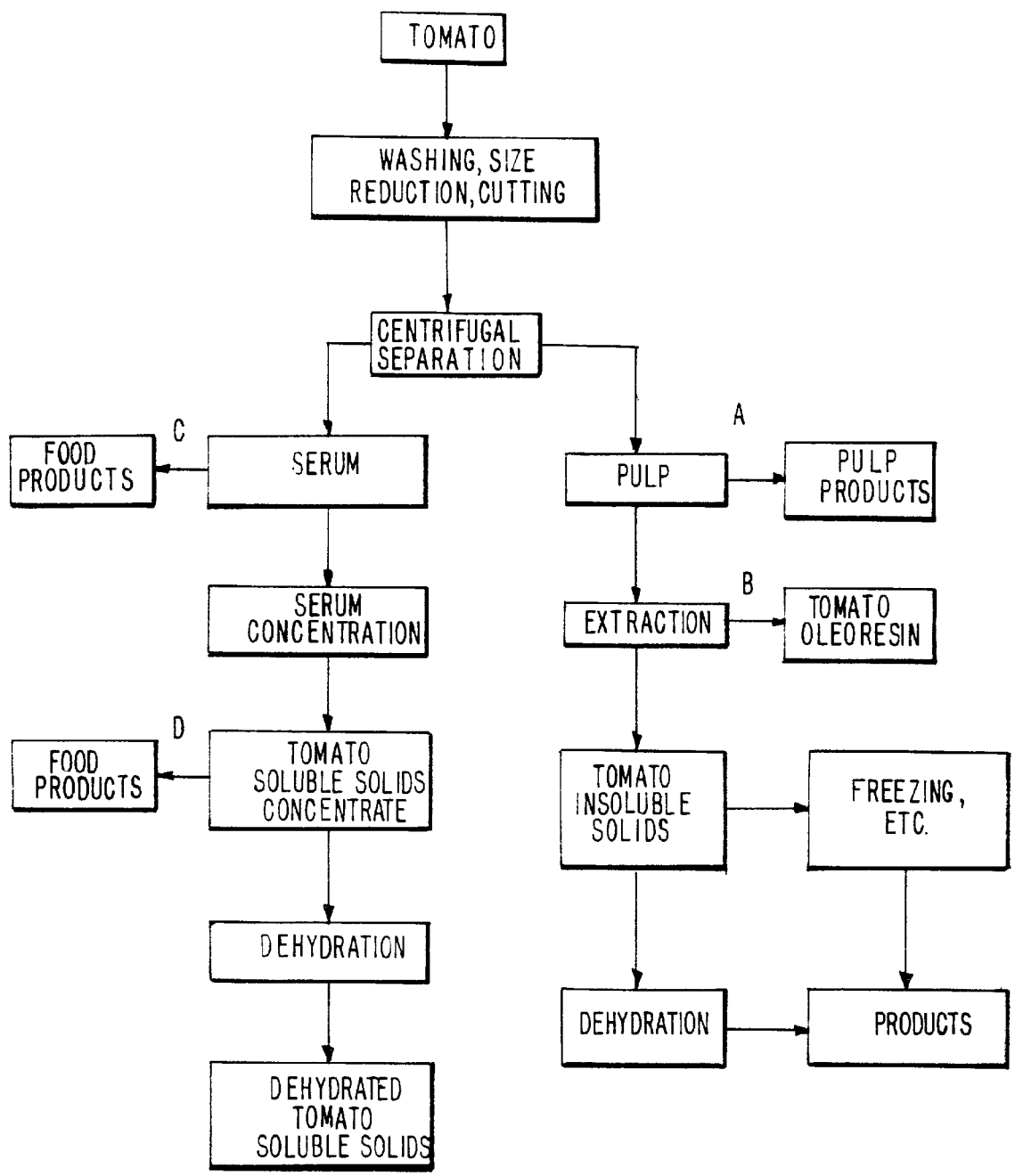
FIG. 6 is another flow chart synthetically illustrating broad aspects of the invention.

FIG. 6 illustrates, in a synthetic manner, certain general aspects of the invention. The tomatoes entering the process are pretreated by washing, crushing, removing waste materials such as stems or foreign bodies, or the like operations, generally according to the known art, and, as will be later explained, to a heat treatment. The output of the separation step, which is fed to the following process stages, consists of two streams: tomato serum and tomato pulp.

Looking first at the right-hand branch, the pulp is distributed as follows:

A parts of the pulp are used as a pulp product or as a raw material for pulp products. The pulp has a number of uses as such, as a raw material for other tomato based products, or as a raw material in the preparation of pulp-derived natural coloring material for food products.

B parts of the pulp are sent to the extraction step, either directly or from a frozen storage. In the extraction step, tomato oleoresin is extracted from the tomato pulp, by any suitable extraction process, e.g., by extraction with solvents. The tomato oleoresin contains a high concentration of lycopene, which can be used as a natural coloring material, e.g., in beverages, drinks, foodstuffs, cosmetics, etc., and as a nutrient in nutraceuticals, health food, etc.

The solid fraction remaining after the extraction step is a slightly colored pulp, which contains mainly insoluble tomato solids. This material is rich in dietary fibers and can be used as such, for the preparation of foodstuffs, as an additive or ingredient, and can further be used as a basis for the preparation of tomato products, as will be better explained hereinafter.

The serum separated in the early centrifugation step is a valuable product as well, since it is used as an ingredient in other food products. Thus, in the scheme, shown in the FIG. 1, C parts of the serum obtained from the centrifugation step are removed, to be used as serum product or as a raw material for tomato products. The remaining serum is concentrated to yield serum concentrate. Serum concentrate has a variety of uses, e.g., is used in the preparation of tomato soups, beverages, etc. The tomato serum contains soluble tomato solids, useful in a variety of food products. As stated above, these soluble tomato solids can further be dehydrated, e.g., into powder form, and used as such.

Figure 1:
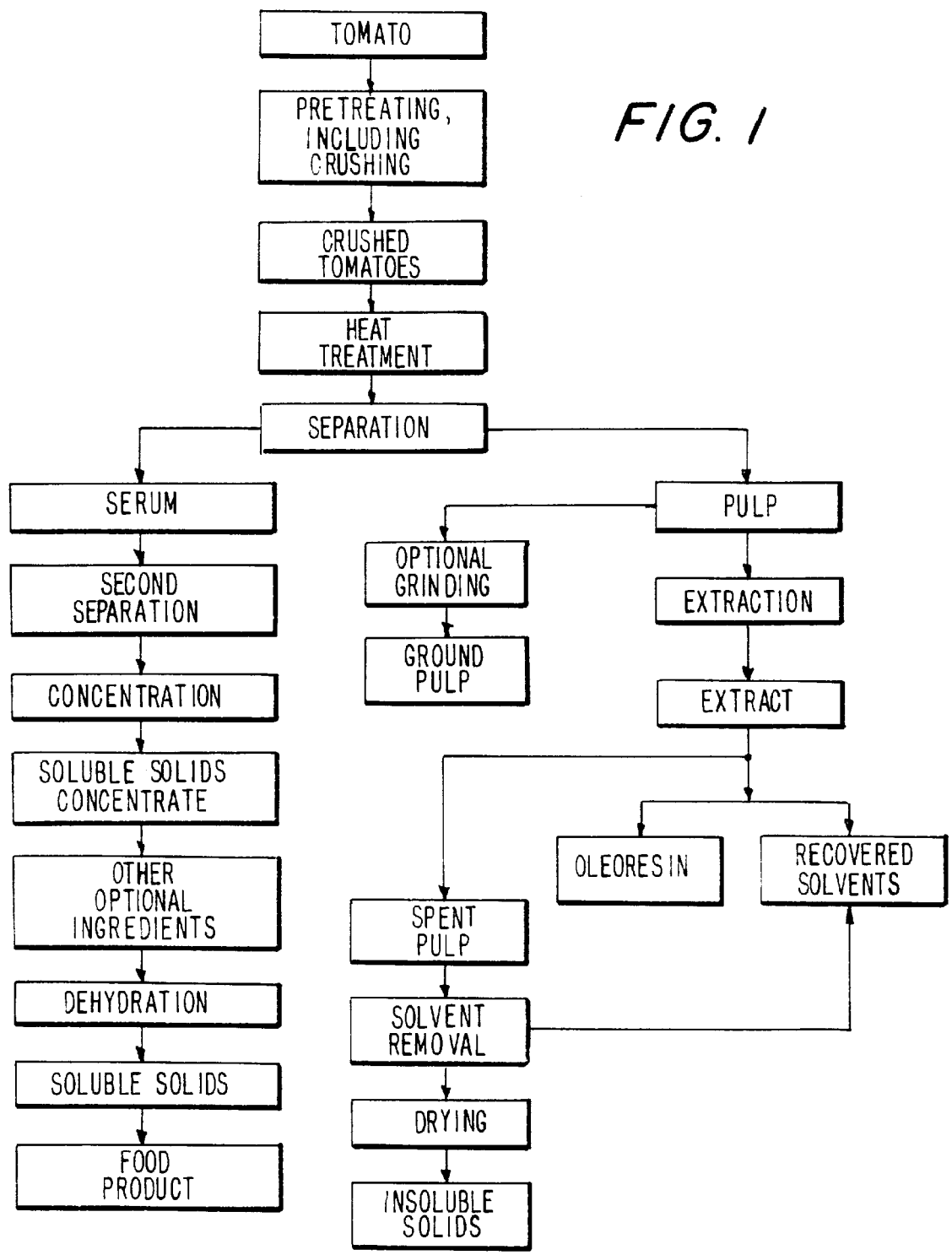
FIG. 1 is a flow chart of an embodiment of the process according to the invention.

FIG. 1 illustrates, in block diagram form, a preferred embodiment of the invention.

The pretreating of the tomatoes includes, besides crushing, at least washing and sorting. The washing is carried out in several stages, e.g., in four stages, at temperatures that may generally vary from 40° to 60° C. After these washings, a sorting is carried out, to eliminate any remaining waste. Then, the tomatoes are crushed and the crushed material is screened to eliminate remaining solid wastes, such as stems, foreign bodies and the like.

Then the crushed tomatoes are heated, preferably with hot water in heat exchangers, to temperatures of up to 80°–110° C., preferably in two stages, heating in the first stage being up to 55° C., e.g. 30° to 55° C. Between the two stages the crushed tomatoes are stored for a period of about 10 to 30 minutes. It has been found that the said heat treatment under those conditions facilitates the subsequent separation of pulp from serum and permits to obtain the highest yield in this operation.

The operations performed on the tomatoes in the aforesaid preliminary stages have an influence on the amount of fines that will be present in the raw material fed to the separation stage. For instance, the use of centrifugal pumps in conveying the crushed tomatoes from one stage of the heat treatment to the next, tends to increase the amount of fines. Overripe tomatoes tend to be broken up into small pieces, impairing the separation of pulp from serum. However, if the amount of fines is found to be excessive, skilled persons will have no difficulty in carrying out processing adjustments so as to reduce it to acceptable limits.

The separation of pulp from serum by centrifugation is then effected The separated tomato pulp is generally about 10 to 13% of the centrifuge feed and, as has been said, the weight ratio of pulp to feed should not be less than 0.08. Lower ratios tend to increase the amount of lycopene that remains in the serum to over 5–10 ppm.

As has been stated, the pulp is sampled and analyzed and any pulp which does not have the desired lycopene content (minimum 500 ppm) is rejected and conveyed to processing by conventional methods. The pulp which meets the aforesaid requirement is finely ground or conveyed to oleoresin extraction process. To assure an even flow of material through the plant, it may be desirable to cool, package, freeze and store the pulp or part of it, but this is merely optional and is not a part of the process according to the invention.

The separated pulp is subjected to extraction by means of solvents, and may be ground to yield a food product, but preferably is either directed to oleoresin extraction, as will be better explained hereinafter, or is dried and ground and the resulting dry insoluble solids are mixed with a soluble solid food product, as will be explained. The serum is subjected to a second separation from solids, then concentrated, and, if desired, dehydrated and the resulting soluble solids are mixed with the aforesaid insoluble solids to produce a valuable food product.

Figure 2:
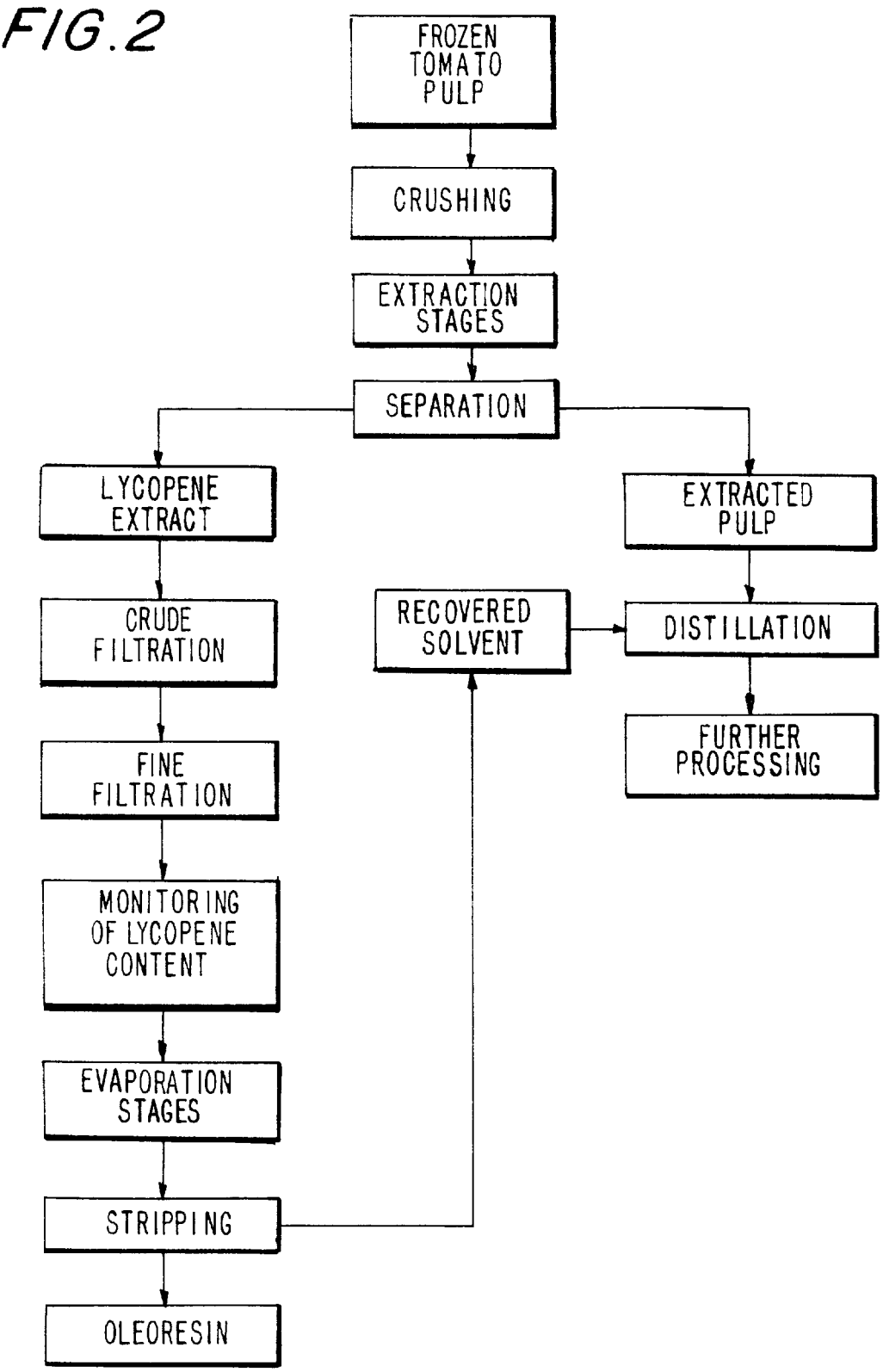
FIG. 2 is a flow chart of the operations which lead, in an embodiment of the process, from the pulp, separated from the serum, to the oleoresin.

FIG. 2 illustrates in block diagram form a preferred embodiment of the processing of the extracted pulp, according to the invention. The tomato pulp is further crushed, if it had been frozen, and is conveyed to extraction by means of solvents to extract the lycopene or the major part of it.

Figure 3:
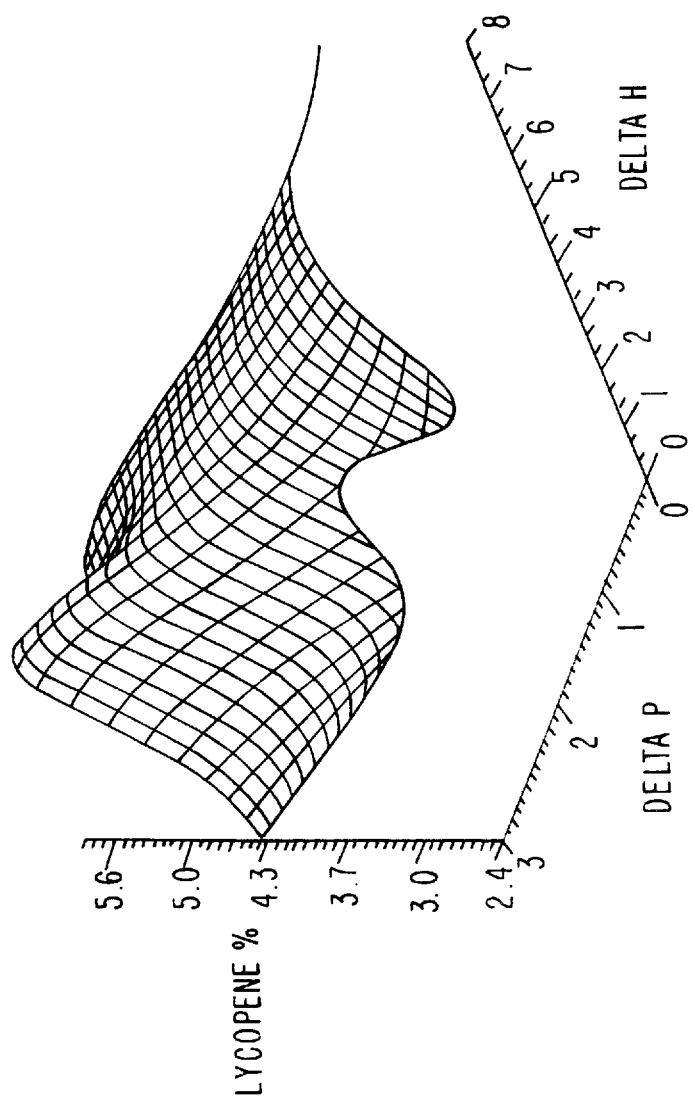
FIGS. 3 to 5 are diagrams illustrating the parameters by which the solvents for the lycopene extraction are chosen.
Figure 4:
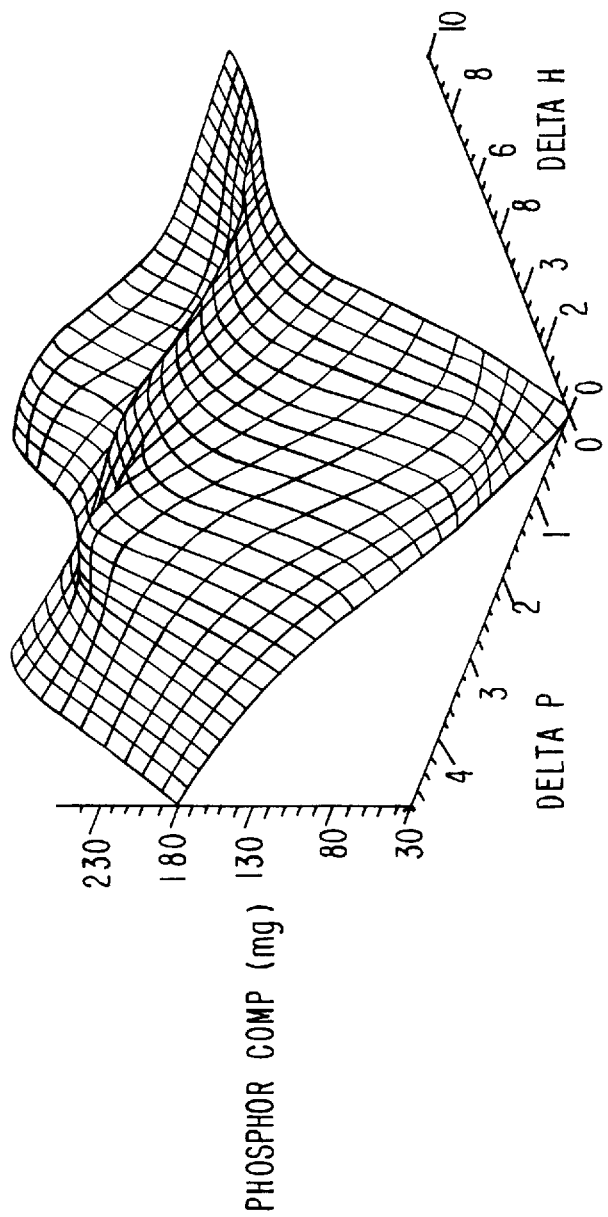
Figure 5:
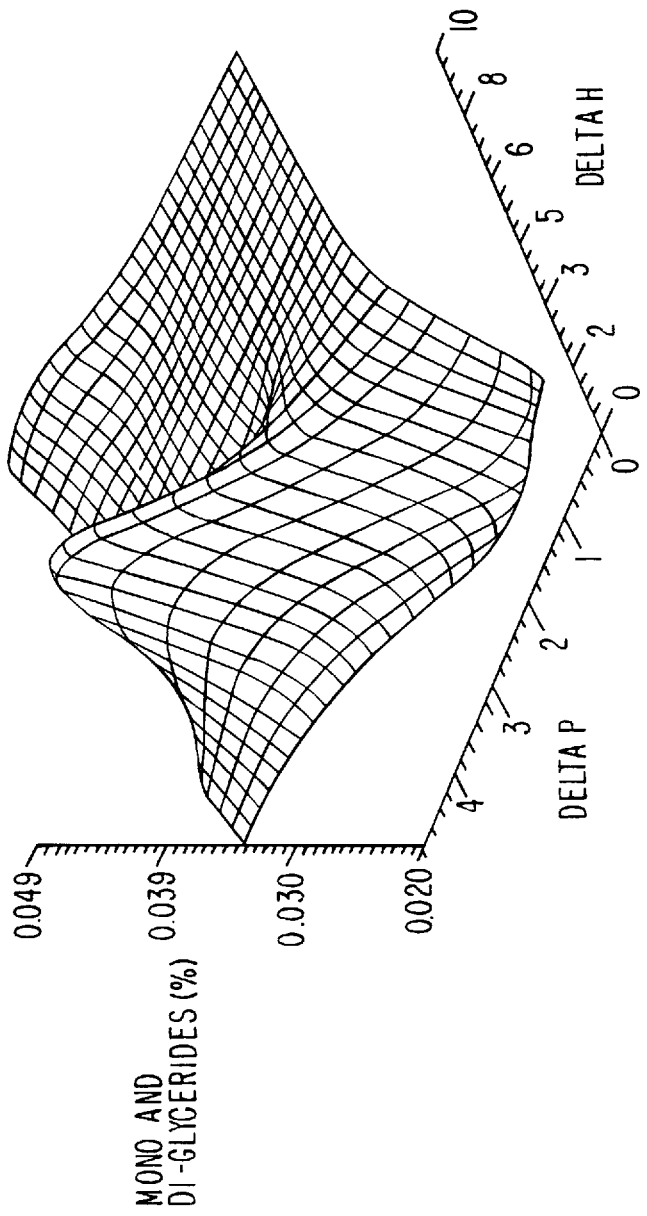

FIGS. 3 to 5 are diagrams which illustrate the relationship between the $\delta_H$ and $\delta_P$ parameters of the solvents and the contents of lycopene, phospholipids—expressed as amount of phosphor by weight—and mono- and di-glycerides and in the oleoresin. FIG. 3 gives the content of lycopene.

FIG. 4 gives the content of phospholipids. These latter, however, are expressed as amount of phosphor by weight, which can be converted to phospholipids by skilled persons through a simple calculation, with sufficient approximation. FIG. 5 gives the amount of the mixture of mono- and di-glycerides. The figures are tridimensional diagrams. Two coordinate axes carry the values of the two $\delta$ parameters and the third axis the contents of the compounds to which the figure refers. The use of the diagrams is obvious: once the desired contents of lycopene, phospholipids and mono- and di-glycerides in the oleoresin has been fixed, the corresponding $\delta$ parameters can be read on the diagrams. However, in general, the three diagrams will not yield the same parameters and it will be necessary to find the best compromise, by changing the contents of lycopene, phospholipids and mono- and di-glycerides, or, as may be sufficient, of one or two of those three components, until the same or nearly the same $\delta$ parameters are read on all three diagrams.

The extraction conditions are: temperature from 40° to 75° C., retention time from 0.3 to 1.2 hours, solvent/pulp ratio, by weight, 1.5, to 3. Preferably, the extraction is carried out under agitation, under the condition that $n^3d^2$ is in the range of 5.8–4, wherein n is the number of revolutions per second and d is the diameter in meters. Further, preferably, the extraction is carried out in more than one stage, generally in three stages. The lycopene extract is separated from the pulp, preferably by means of a continuous decanter, and is then filtered. Preferably, the filtration is in two stages, a crude one and a fine one, to ensure the removal of even the very fine particles of pulp. The last filter preferably has a mesh size of 2 microns. Desirably, the lycopene content of the extract is monitored, to ensure that the extraction has been fully efficient, and, if needed, to adjust its time and temperature.

The filtered lycopene extract is then evaporated under high vacuum, preferably in three successive stages, in which the temperature is increased from 40° to 85° and a final stripping of the solvent is preferably carried out by neutral gas, e.g. nitrogen, flushing. Evaporated and stripped solvent is recovered by conventional means, that need not be described. It is to be noted that the pulp from which the lycopene extract has been separated still contains a certain amount of solvent, which is also recovered by heating and azeotropic distillation, e.g. at 90°–120° C., and joined with the solvent evaporated from the lycopene extract.

After separation from the solvent, the pulp can be used in conventional food processing, comprising dehydrating, freezing and further conventional treatments.

The oleoresin obtained after evaporation of the solvent can, preferably, be standardized by blending low lycopene and high lycopene containing oleoresins to obtain a standard lycopene content, which varies between 4 and 12%.

EXAMPLE 1

10,000 Kg of tomato containing 100 ppm lycopene were processed according to the process of the invention. After washing, crushing and waste separation, 9,500 Kg of processable material remained. The material was fed to a decanter (Westphalia CA-365-010, revolution speed 4,000 rpm) and separated into two streams: tomato pulp (900 Kg) and tomato serum (8,600 Kg). The serum contained 10 ppm lycopene and was further centrifuged in an Alpha Laval centrifuge (BRPX617SFV-31 CGL-50) at 4050 rpm, to give a 5 ppm of lycopene-containing serum. The pulp can be used separately or unified, as desired. The serum was concentrated by evaporation under reduced pressure and temperature, to give a final weight of 710 Kg soluble tomato solids concentrate at 60 Bx. 310 Kg were used as such, as an additive to vegetable drinks, and 400 Kg were mixed with tomato juice and further processed by spray-drying. The resulting dry powder (237 Kg) was used as a basis for the preparation of tomato soup.

The 900 Kg of tomato pulp were divided into ten 90 Kg portions. Each 90 Kg portion was extracted with 250 Kg of warm (50° C.) dichloromethane After evaporation of the solvent 1150 gr of tomato oleoresin were obtained. The solvent was removed by azeotropic distillation. The extracted pulp (still about 90 Kg) was fed to a dehydration step (drum dryer) from which 18 Kg of insoluble tomato solids were obtained. This product was later used as an ingredient for cereals, baked products, health food bars, food products rich in dietary fibers, etc.

EXAMPLE 2

10,000 Kg of tomato containing 100 ppm lycopene were processed according to the process of the invention. After washing, crushing and waste separation, 9,500 Kg of processable material remained. The material was deaerated, heated to 95° C. and fed to a decanter (Westphalia CA-365-010, revolution speed 4,000 rpm) and separated into two streams: tomato pulp (900 Kg) and tomato serum (8,600 Kg). The serum contained 10 ppm lycopene and was further centrifuged in an Alpha Laval centrifuge (BRPX617SFV-31 CGL-50) at 4050 rpm, to give a 5 ppm of lycopene-containing serum. The solids removed in this centrifugation were refluxed to the aforesaid decanter. The pulp can be used separately or unified, as desired. The serum was concentrated by evaporation under reduced pressure and temperature, to give a final weight of 710 Kg soluble tomato solids concentrate at 60 Bx. 310 Kg were used as such, as an additive to vegetable drinks, and 400 Kg were mixed with tomato juice and further processed by spray-drying The resulting dry powder (237 Kg) was used as a basis for the preparation of tomato soup.

The 900 Kg of tomato pulp were divided into ten 90 Kg portions. Each 90 Kg portion was extracted twice, each time with 250 Kg of warm (50° C.) ethyl acetate for one hour, and then fed to a decanter for separation of the solids from the mother liquor. The mother liquor, which contains the lycopene was evaporated for solvent removal and yielded 1207 gr. of oleoresin containing 6.8% of lycopene. The solvent remaining in the pulp was removed by azeotropic distillation. The spent and desolventized pulp (still about 90 Kg) was fed to a dehydration step (drum dryer) from which 14 Kg of insoluble tomato solids were obtained. This product was later used as an ingredient for cereals, baled products, health food bars, food products rich in dietary fibers, etc.

EXAMPLE 3

1000 kg of tomatoes, of the highest grade and suitable for industrial processing were used. Lycopene content 150 ppm, Bx=5.2. Bx is the measure of the total soluble solids, expressed as if they were sucrose, measured by means of a refractometer.

After washing, classification, crushing etc., 950 kg of tomato raw material remained.

The tomato material was warmed to 80° C. and subjected to separation in a decanter (Westphalia CA-365-010). The decanter screw was spun at 4000 rpm and the differential speed was set at values between 12 and 18 rpm.

Two products are obtained from the separation: 94 kg pulp and 860 kg serum. The pulp contains 1426 ppm lycopene and 81% water. The serum contains 8 ppm lycopene, Bx=5. The lycopene yield is 94%.

After concentrating the tomato serum to Bx=60, it contains 96 ppm lycopene and weighs 71 kg.

The 90 kg of pulp are extracted with 250 kg ethyl acetate, 3 times at 50° C. at a retention time of one hour and the phases are separated by using a continuous decanter. The mother liquor, which contains the lycopene, is evaporated for solvent removal. The amount of oleoresin thus obtained is 1.64 kg. The lycopene concentration in the oleoresin is 7.5%. After removal of the solvent (ethyl acetate) still contained therein by azeotropic distillation, the pulp weighs 72 kg and contains 80% water and 60 ppm lycopene.

After drying, 14.8 kg of insoluble solids from tomatoes are obtained, with a water content of 3%.

EXAMPLE 4

The operations of Example 2 were repeated, but with overripe tomatoes containing 120 ppm of lycopene. The separation in the decanter gave the following amounts of lycopene: 1000 ppm in pulp, 30 ppm in serum.

The same separation carried out for purposes of comparison with solid tomatoes, having the same lycopene content, gave the following amounts of lycopene: 1266 ppm in pulp; 8 ppm in serum

EXAMPLE 5

This example illustrates the effect of the lycopene content in the tomatoes on the results of the separation in a decanter, the ppm indicating the lycopene contents:
tomato with 70 ppm: 800 ppm in pulp, 3 ppm in serum
tomato with 190 ppm: 1500 ppm in pulp, 10 ppm in serum
tomato with 150 ppm: 1200 ppm in pulp, 10 ppm in serum

EXAMPLE 6

This example illustrates the effect of the degree of crushing of the tomatoes on the separation of pulp from serum in a decanter.

Tomatoes containing 120 ppm of lycopene were crushed in a Stephan Crusher, and the crushed tomatoes underwent separation in a Sharpless centrifuge.

When the crushing lasted 1 minute, the separation yielded the following results: 1200 ppm lycopene in pulp, 12 ppm lycopene in serum, yield of lycopene in pulp 94%

When the crushing lasted 5 minutes, the separation yielded the following results: 1150 lycopene in pulp, 43 ppm in serum, yield of lycopene in pulp 72%.

EXAMPLE 7

This example illustrates the effect of the feeding temperature on separation of pulp from serum in a centrifuge.

Tomatoes with 100 ppm of lycopene were the starting material. The separation was effected in a laboratory centrifuge, at various temperatures. The results are tabulated below.

| Feeding temperature | feed to pulp weight ratio |
| --- | --- |
| 30° C. | 5.5 |
| 50° C. | 7 |
| 90° C. | 9 |

The first two separations were carried out in three phases and the last in two phases. The average lycopene content of the first two phases (the only phases in the third separation) was, respectively: 45 ppm, 30 ppm and 5 ppm. In all cases the serum was clear.

EXAMPLE 8

This example illustrates the effect of the feeding temperature on separation of pulp from serum.

The separation was effected in a Westphalia CSA-8 decanter. The result are tabulated below.

| | Lycopene content | |
| --- | --- | --- |
| Feeding temperature | in pulp | in serum |
| 80° C. | 800 ppm | 10 ppm |
| 50° C. | 700 ppm | 50 ppm |

EXAMPLE 9

This example illustrates the effect of the speed of rotation of a centrifuge on the separation of pulp from serum.

Tomatoes containing 80 ppm of lycopene were the starting material. A laboratory centrifuge was used. The result are tabulated below.

| | Lycopene content | | Water in pulp |
| --- | --- | --- | --- |
| Centrifuge Speed | in pulp | in serum | % by weight |
| 3000 rpm | 450 ppm | 15 ppm | 90% |
| 6000 rpm | 600 ppm | 11 ppm | 86% |

EXAMPLE 10

This example illustrates the effect of the speed of rotation of a decanter on the water content of the pulp after separation from serum.

Tomatoes containing 80 ppm of lycopene were the starting material. A pilot decanter was used for the separation.

The result are tabulated below.

| Decanter Speed | Water in pulp (% by weight) |
|---|---|
| 3500 rpm | 85% |
| 5000 rpm | 81% |

EXAMPLE 11

This example illustrates the effect of the relative speed of the screw on the separation of pulp from serum in a decanter. Tomatoes containing 80 ppm lycopene were the starting material. The separation was effected in a Westphalia CSA-8 industrial decanter. The result are tabulated below.

| Decanter Screw Relative Speed | Lycopene content in pulp | Lycopene content in serum | Water in pulp % by weight |
|---|---|---|---|
| 20 rpm | 800 ppm | 10 ppm | 81% |
| 30 rpm | 515 ppm | 20 ppm | 84% |
| 40 rpm | 200 ppm | 50 ppm | 86% |

EXAMPLE 12

3 parts by weight of tomato serum concentrate and 1 part of ground, dehydrated tomato pulp were mixed and drum dried. They were then ground to free flowing powder, which can be used in may ways as a valuable food product.

As will be apparent to the skilled person the process of the invention is unique insofar as it exploits the tomato in its entirety. The description given above refers, for the sake of simplicity, to a limited number of end streams. It is clear, however, that additional streams can be created, to obtain additional end products. Accordingly, the invention is not limited to such exemplified products, and is intended to encompass all equivalent processes. Thus, many modifications can be effected by the skilled engineer in the various streams, methods, equipment and products described above, without exceeding the scope of the invention.

We claim:

1. Process for the manufacture of tomato products, comprises the steps of:
   a) pretreating the tomatoes by conventional operations, including crushing;
   b) subjecting them to a heat treatment;
   c) separating the crushed tomatoes into serum and pulp containing at least 500 ppm of lycopene;
   d) subjecting the pulp to solvent extraction, in order to extract therefrom an oleoresin containing lycopene;
   e) separating the spent pulp; and
   f) separating the lycopene extract from the solvents, whereby to obtain oleoresin containing the lycopene and to recover the solvents.

2. Process according to claim 1, where the pulp contains from 500 to 1600 ppm, of lycopene.

3. Process according to claim 1, wherein the separation of pulp from serum is carried out by centrifugation at temperatures between 75° and 110° C. and centrifugal force between 2600 and 4000 G.

4. Process according to claim 3, wherein the crushed tomatoes subjected to separation of pulp from serum have a content of solid particles between 4 and 8 ww %.

5. Process according to claim 4, wherein the crushed tomatoes subjected to separation of pulp from serum have a content of solid particles, having a dimension below 20 $\mu$m, of less than 0.2 ww %.

6. Process according to claim 3, wherein the weight ratio of separated pulp to crushed tomato feed is not less than 0.13.

7. Process according to claim 1, wherein the heat treatment comprises heating the crushed tomatoes to temperatures of up to 80°–110° C., in two stages, heating in the first stage being up to 55° C., and storing the crushed tomatoes between the two heating stages for about 10 to 30 minutes.

8. Process according to claim 1, wherein the oleoresin contains 2–10% of lycopene, 0.7–4.5%, of phospholipids and 2–6% of mono- and di-glycerides.

9. Process according to claim 1, wherein the extraction of the oleoresin from the pulp is carried out by means of a solvent or solvent mixture having $\delta_H$ between 0.0 and 5.0 and $\delta_P$ between 0.0 and 10.0.

10. Process according to claim 1, wherein the extraction of the oleoresin from the pulp is carried out by fixing the desired contents of lycopene phospholipids and mono- and di-glycerides of the oleoresin, and choosing a solvent or solvent mixture having $\delta_H$ between 0.0 and 4.5 and $\delta_P$ between 0.0 and 10.0.

11. Process according to claim 1, wherein the extraction of the oleoresin from the pulp is carried out in several stages.

12. Process according to claim 1, wherein the extraction of the oleoresin from the pulp is carried out at temperatures from 40° to 75° C., with retention time from 0.3 to 1.2 hours, and solvent/pulp ratio, by weight, 1.5 to 3.

13. Process according to claim 1, wherein the extraction of the oleoresin from the pulp is carried out under agitation, under the condition that $n^3 d^2$ is in the range of 5.8–4, wherein n is the number of revolutions per second and d is the diameter in meters.

14. Process according to claim 1, wherein the extracted oleoresin, separated from the pulp, is filtered.

15. Process according to claim 14, wherein the filtration is in two stages, a crude one and a fine one.

16. Process according to claim 1, further comprising mixing the extracted pulp, from which the solvent has been recovered, with concentrated serum, and drying the mixture.

17. A tomato food product, consisting of a mixture of extracted and dried tomato pulp and concentrated tomato serum, which is substantially free from sugars and agrochemicals, is low in lipids, and has a water content less than 5 ww %.

18. Process for producing a tomato food product consisting of a mixture of extracted and dried tomato pulp and concentrated tomato serum, which is substantially free from sugars and agrochemicals, is low in lipids, and has a water content less than 5 ww %, which comprises:
   a) pretreating the tomatoes by conventional operations, including crushing;
   b) subjecting them to a heat treatment;
   c) separating the crushed tomatoes into a pulp and a serum;
   d) extracting, drying and grinding the pulp to an average particle size of 50–150 microns;
   e) concentrating the serum;
   f) mixing the dried ground pulp with the concentrated serum; and
   g) re-drying the mixture.

* * * * *